United States Patent [19]

Reinartz et al.

[11] 4,427,239
[45] Jan. 24, 1984

[54] DUAL-CIRCUIT PRESSURE CONTROL VALVE

[75] Inventors: Hans D. Reinartz, Frankfurt am Main; Bernd Schopper, Hattersheim, both of Fed. Rep. of Germany

[73] Assignee: ITT Industries, Inc., New York, N.Y.

[21] Appl. No.: 231,706

[22] Filed: Feb. 5, 1981

[30] Foreign Application Priority Data

Mar. 11, 1980 [DE] Fed. Rep. of Germany ....... 3009288

[51] Int. Cl.³ .......................... B60T 8/02; B60T 8/18
[52] U.S. Cl. .................................. 303/22 R; 188/195
[58] Field of Search ............... 303/22 R, 22 A, 6 C, 303/6 R, 84 A, 84 R; 188/195, 349

[56] References Cited

U.S. PATENT DOCUMENTS

| | | | |
|---|---|---|---|
| 3,731,981 | 5/1973 | Bueler | 303/22 R |
| 3,904,253 | 9/1975 | Riquart | 303/22 R |
| 4,101,176 | 7/1978 | Carre et al. | 303/22 R X |
| 4,332,423 | 6/1982 | Schopper et al. | 303/22 R |

*Primary Examiner*—Douglas C. Butler

*Attorney, Agent, or Firm*—John T. O'Halloran; Alfred C. Hill

[57] ABSTRACT

Dual-circuit brake force control systems are known in which the initial preloading force is changeable dependent on the vehicle load. The initial preloading force is distributed to the control pistons by a lever. Due to manufacturing tolerances and erosion of the individual elements, considerable differences in pressure in both brake circuits may occur. Therefore, according to the instant invention a control lever is provided to directly actuate both control pistons and which is rotatable about an axis perpendicular to the axes of the control pistons and also rotatable about the longitudinal axis of the lever. A holding member shaped like a ball bearing enables the lever to rotate about these two axes. Adjustable stops are provided which cooperate with circular stop surfaces extending from the lever on opposite sides of the longitudinal axis with the center of the stop surfaces being disposed in a plane parallel to the longitudinal axes of the control piston and containing the axes of the control piston.

21 Claims, 11 Drawing Figures

DUAL-CIRCUIT PRESSURE CONTROL VALVE

BACKGROUND OF THE INVENTION

The present invention relates to a dual-circuit pressure control valve having a change-over point adjustable from the outside for use in hydraulic dual-circuit brake systems of automotive vehicles. The pressure control valve includes two cylinders each connected to one of the two brake circuits arranged parallel to each other in a housing and containing therein control pistons whose actuating tappets project outwardly on the same end face of the cylinders and are directly acted upon by a common control lever. The control lever may be subjected to a control force and is supported at the housing tiltably around a transverse axis, which runs perpendicular relative to the cylinder axes, and around its longitudinal axis, with means being provided for an even distribution of the control force onto the two control pistons and with stop means being provided between the control lever and components which are fastened to the housing, which stop means limit the tilting movement of the lever around its longitudinal axis without inhibiting the tilting movement around its transverse axis as described in copending U.S. patent application of B. Schopper and P. Tandler, Ser. No. 160,523 filed June 18, 1980, now U.S. Pat. No. 4,332,423, issued June 1, 1982, assigned to the same assignee as the instant application.

The above-cited copending application describes a dual-circuit pressure control valve, which safeguards an even distribution of the control force onto both control pistons without any complicated force transmission elements in a simple, yet reliable manner. In a preferred embodiment of the known dual-circuit pressure control valve, stop means are provided between the lever and components fastened to the housing which limit the tilting movement of the lever around its longitudinal axis without inhibiting the tilting movement around its transverse axis. In this way—upon failure of one brake circuit and the thereby incurred retreat of the associated brake piston—the control lever is permitted to follow this movement only to a small degree so that it does not exert any force on the control piston of the failed circuit. Thus, the remaining, still intact control piston is now acted upon by double the amount of control force with the load on the control lever not having changed, thereby increasing the changeover point of this intact brake circuit correspondingly.

SUMMARY OF THE INVENTION

It is an object of the present invention to improve upon the stop means of the dual-circuit pressure control valve of the above-cited copending application to the extent that, in the event of failure of the one brake circuit, the control force increase in the other intact brake circuit commences after only an extremely short tilting movement of the control lever around its longitudinal axis.

A feature of the present invention is to provide a dual-circuit pressure control valve to control pressure in each circuit of a hydraulic dual-circuit brake system for automotive vehicles comprising: a common control lever having a longitudinal axis, the control lever being subjected to a control force and acting upon a pair of control valve actuating tappets extending out of one surface of a housing, each of the pair of actuating tappets controlling pressure in a different one of the brake circuits; support means to support the control lever at the housing tiltable around the longitudinal axis and a transverse axis perpendicular to the longitudinal axes of the pair of actuating tappets and the longitudinal axis; and stop means disposed between the control lever and the housing to limit tilting of the control lever around the longitudinal axis without inhibiting tilting of the control lever around the transverse axis, the stop means including a housing stop surface adjacent the one surface of the housing, and a pair of circular stop surfaces each extending from the control lever on opposite sides of the longitudinal axis toward the one surface of the housing adjacent the housing stop surface, a central point of each of the pair of circular stop surfaces being disposed in a plane parallel to the longitudinal axes of the pair of actuating tappets containing the transverse axis, the pair of circular stop surface and the housing stop surface being spaced a predetermined distance from each other such that, upon failure of one of the brake circuits, that one of the pair of circular stop surfaces associated with that one of the pair of actuating tappets associated with the other of the brake circuits engages the housing stop surface after only a slight inward movement of the other of the pair of actuating tappets associated with the one of the brake circuits.

It is accomplished by the construction in accordance with the present invention that the supporting of the control lever when tilting around its longitudinal axis in the case of failure of one brake circuit is effected exactly at the level or plane containing the transverse axis so that a doubling of the amount of control force will be provided in the still operative brake circuit immediately after abutment of the circular outline of the lever at the housing. The distance of this outline from the oppositely disposed stop surface of the housing is able to be adjusted very precisely to the smallest possible values by adjusting screws located on the control lever. The manufacture of the circular stop surfaces or outline is possible with least cost and effort when constructing the control lever as a sheet metal punched and bent part, since the circular outline is allowed to be manufactured in the same working operation.

The present invention affords particular advantage when used in a dual-circuit pressure control valve in which the lever includes a ball cap in the supporting area, in which cap a ball end is received which is fastened to the housing by means of a bolt extending through a bore in the lever. With the ball end being fastened to the housing adjustably in the direction of the bolt axis, a minimum distance of the circular stop surface of the control lever is allowed to be adjusted.

A first practical embodiment is characterized in that the bolt is secured to an angled member bearing the stop surface, which angled member is fastened to the housing adjustably in a direction parallel to the longitudinal bolt axis and in that the ball end is held at the bolt by means of a nut. Preferably, the angled member includes a leg extending parallel to the bolt, the leg being secured to a corresponding surface of the housing through slotted holes extending parallel to the longitudinal axis of the bolt.

The fitting of the control lever to the housing is effected such in this embodiment that the lever and the angled member are first of all screwed together by tightening the nut without clearance. This constructional unit will then be mounted on the actuating tappets of the hydraulically pressurized control pistons.

This causes a defined setting of the arrangement in one plane. The other plane will be fixed by corresponding devices. On account of the slotted holes provided in one leg, the constructional unit is permitted to be displaced only enough until it is seated perfectly on the two actuating tappets. The angled member is fastened to the housing in this position. By slightly loosening the nut, the necessary clearance is able to be established between the circular stop surfaces of the lever and the stop surface at the angled member which is now fastened to the housing.

Another practical embodiment is characterized in that the stop surface of the housing is formed by the leg of an angled member secured to the housing, which leg includes an opening for the bolt to pass through. Consequently, in this embodiment, the bolt bearing the ball end is not fastened to the angled member, but rather directly to the housing.

The control lever is secured to the housing by means of the bolt in this embodiment. The control pistons are acted upon by hydraulic pressure. In this arrangement, the control lever is aligned to engage the actuating tappets acted upon by the control pistons. Now, the angled member which is fastened to the housing by means of slotted holes is shifted towards the circular stop surface of the control lever, that is to say, in such a manner that the desired small clearance still remains. Suitable gauges may be employed for this. After this adjustment has been realized, the angled member is fixed in its position by tightening setscrews.

The advantages of these pressure control valves is the occurrence of only a slight loss in volume upon failure of a circuit. Because of the small closure travel, there is but insignificant wear. The overall length is very small as well. Because of the small distance existing between the circular stop surface of the lever and the housing, in the event of failure of one circuit, a great increase of the change-over pressure of the other circuit will be attained despite small closure travels.

In a favorable improvement of the present invention, the ball end may be a component part of the bolt, the bolt being screwed into an extension of the housing down to the required depth. The bolt may also penetrate through the extension and be secured by a nut.

Finally, there can be provided in all embodiments a helical spring that encircles the bolt and urges the ball cap against the ball end.

In another embodiment, the distance between the circular stop surfaces of the control lever and the stop surface at the housing may be set fixedly to begin with. If, according to this further embodiment, axially adjustable tappets are located opposite to the actuating tappets at the control lever, the axially adjustable tappets can then be urged into engagement with the actuating tappets by axial displacement, the actuating tappets being in their activated position when the two brake circuits are pressurized.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

The construction and operation of the dual-circuit pressure control valve located in the housing 23 in accordance with the present invention are the same as those of the dual-circuit pressure control valve described in the above-cited copending application and the patents referred to therein, whose disclosure is incorporated herein by reference.

Figure 1:
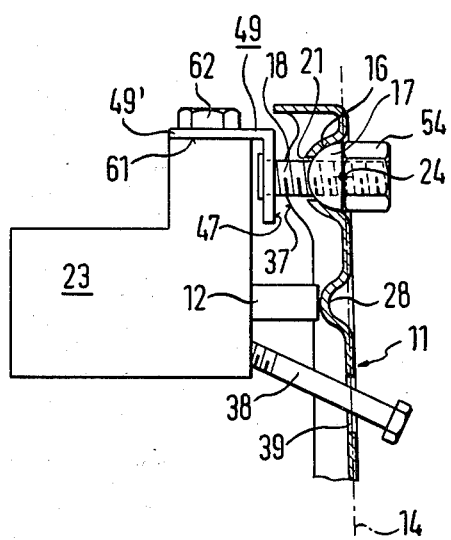
FIG. 1 is a schematic lateral view, partially in cross-section, of a first embodiment of a dual-circuit pressure control valve in accordance with the principles of the present invention.

According to FIG. 1, the actuating tappets 12 of the dual-circuit pressure control valve act on indentations 28 of the control lever 11 in the same manner as is described in the above-cited copending application.

Figure 10:
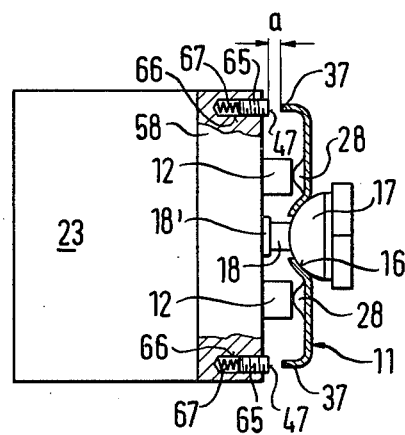
FIG. 10 is a topview, partially in cross-section, of the embodiment of FIG. 9.
Figure 11:
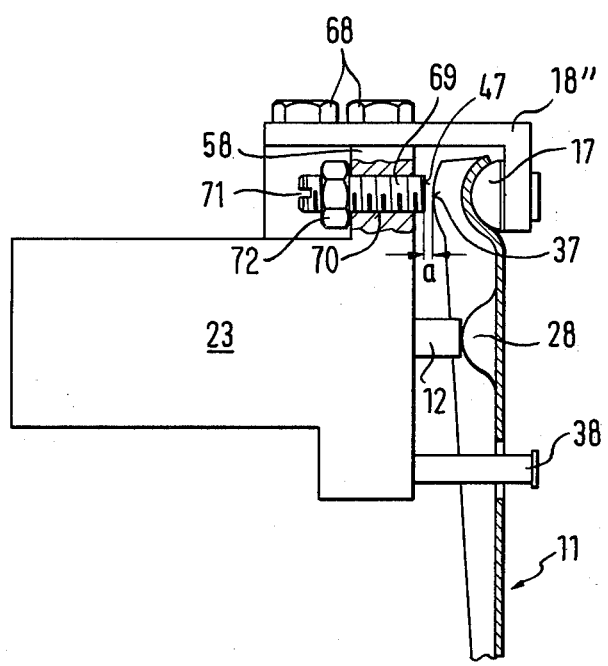
FIG. 11 is a schematic lateral view, partially in cross-section, of a sixth embodiment of a dual-circuit pressure control valve in accordance with the principles of the present invention.

The guiding bolt 38 extending diagonally through a slotted hole 39 of control lever 11 is screwed into housing 23 and provides the same purpose as the guiding bolt according to FIGS. 10 through 12 of the above-cited copending application which is assigned the same reference numeral.

Figure 2:
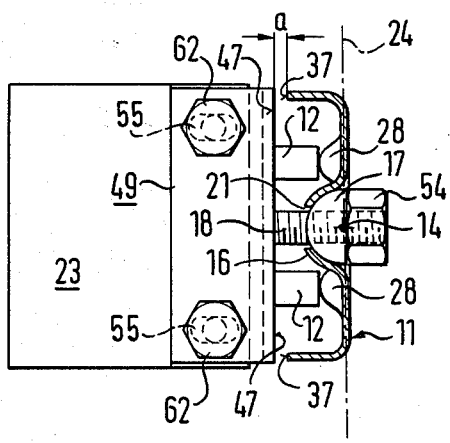
FIG. 2 is a top view, partially in cross-section, of the embodiment of FIG. 1.

In the area of the transverse tilting axis 24, lever 11 includes a ball cap 16 in which a ball end 17 is engaged, ball end 17 including a central bore through which a bolt 18 is inserted. A nut 54 is screwed on the outer end portion of bolt 18 to fix ball end 17 in position. The other end portion of bolt 18 is fastened to an angled member 49 extending over the width of lever 11 according to FIG. 2. Control lever 11 itself is of a basically U-shaped cross section construction as seen in FIG. 2. In the area of ball cap 16, the legs of control lever 11 are constructed circularly in such a manner that the central points of the circular stop surfaces or outlines 37 of these legs coincide with a plane parallel to the axes of tappets 12 containing the transverse tilting axis 24. Hence, a circular stop surface 37 exists on both sides of lever 11 at the level of transverse axis 24 spaced equidistant from the longitudinal tilting axis 14, circular stop surface 37 having a small distance "a" from the oppositely or adjacently disposed stop surface 47 of angled member 49 according to FIGS. 1 and 2. Consequently, angled member 49 serves both as mounting support of bolt 18 and as a stop surface for stop surfaces 37.

Leg 49' of angled member 49 is bent off horizontally from the vertical, overlaps a horizontal surface 61 of housing 23 and is fastened to surface 61 by means of threaded bolts 62.

As is indicated in FIG. 2, leg 49' includes for insertion of bolts 62 slotted holes 55 extending parallel to the longitudinal axis of bolt 18.

The assembly of control lever 11 in accordance with FIGS. 1 and 2 is carried out as follows: angled member 49 and control lever 11 are first of all screwed rigidly to each other by means of bolt 18 and nut 54 in such a manner that stop surfaces 37 are in abutment with stop surface 47 of angled member 49. Both brake circuits are then pressurized causing actuating tappets 12 to move a maximum distance out of housing 23. The constructional unit including angled member 49 and control lever 11 is assembled to housing 23 until the two indentations 28 abut the adjacent ends of tappets 12. Leg 49' of angled member 49 is fastened to housing 23 by means of bolts 62 in this state. By a defined turning back of nut 54, the desired small distance "a" between stop surfaces 37 and stop surface 47 is adjusted.

Bolt 38, which was initially not present, may then be guided through slotted hole 39 and screwed into housing 23.

Figure 3:
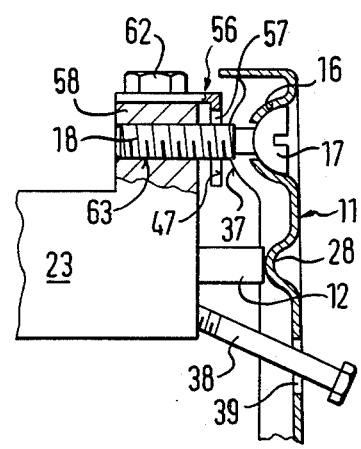
FIG. 3 is a schematic lateral view, partially in cross-section, of a second embodiment of a dual-circuit pressure control valve in accordance with the principles of the present invention.
Figure 4:
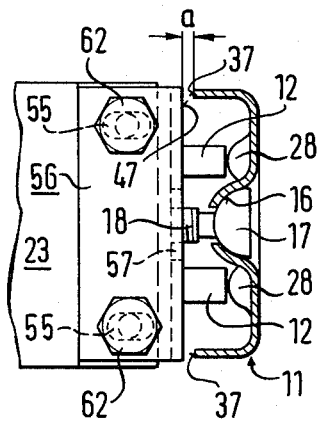
FIG. 4 is a top view, partially in cross-section, of the embodiment of FIG. 3.

In the case of the embodiment according to FIGS. 3 and 4, in which like parts are assigned like reference numerals as in FIGS. 1 and 2, ball end 17 is rigidly arranged at the end portion of bolt 18. Included in the angled member 56 screwed onto housing 23 is—in contrast to angled member 49 of FIGS. 1 and 2—a central opening 57 through which bolt 18 is guided and then screwed into a taphole 63 in extension 58 of housing 23. The vertical leg of angled member 56 forms again stop surface 47 for circular stop surfaces 37 of control lever 11.

In this embodiment, angled member 56 is first fastened loosely to housing 23 by means of bolts 62. With the brake circuits pressurized, control lever 11 will then be screwed to extension 58 of housing 23 by means of bolt 18, whereupon indentations 28 abut tappets 12. Angled member 56 will be displaced in the direction of circular stop surfaces 37 sufficiently by means of slotted holes 55 until the desired small distance "a" is realized. Gauges can be used in this structure which are guided between stop surface 47 and stop surfaces 37. After having set the correct distance "a", bolts 62 are tightened resulting in the final fixing of the adjustment to achieve distance "a".

Figure 5:
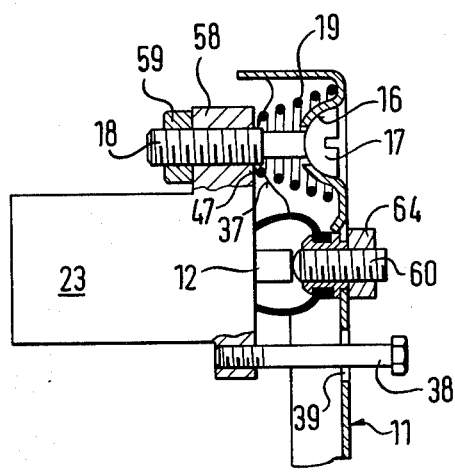
FIG. 5 is a schematic lateral view, partially in cross-section, of a third embodiment of a dual-circuit pressure control valve in accordance with the principles of the present invention.
Figure 6:
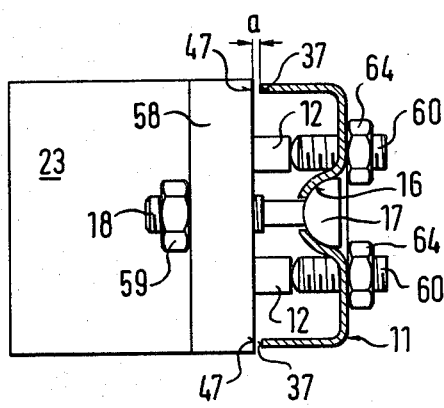
FIG. 6 is a top view, partially in cross-section, of the embodiment of FIG. 5.

In the embodiment according to FIGS. 5 and 6, bolt 18 extends through extension 58 of housing 23. Bolt 18 is secured by a lock nut 59. The angled member 56 of FIG. 3 is dispensed with. Circular stop surfaces 37 cooperate instead directly with a stop surface 47 at housing 23. By screwing bolt 18 to a specific depth in extension 58 and by employing gauges, the desired small distance "a" is established between circular stop surfaces 37 and stop surface 47. For achieving a perfect abutment of control lever 11 at actuating tappets 12 in this position, adjusting tappets 60 are supported axially adjustably in control lever 11 opposite to each actuating tappet 12. Adjusting tappets 60 include external threads and are secured by lock nuts 64. By such a construction it is also possible to obtain a perfect abutment of control lever 11 at both actuating tappets 12 and, at the same time, the correct clearance "a" between stop surfaces 37 and 47. A spring 19 extends between extension 58 and control lever 11 and urges ball cap 16 against ball end 17.

Figure 7:
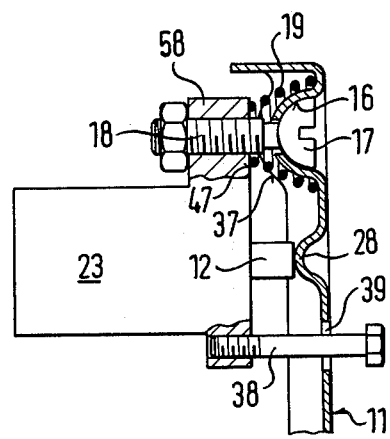
FIG. 7 is a schematic lateral view, partially in cross-section, of a fourth embodiment of a dual-circuit pressure control valve in accordance with the principles of the present invention.
Figure 8:
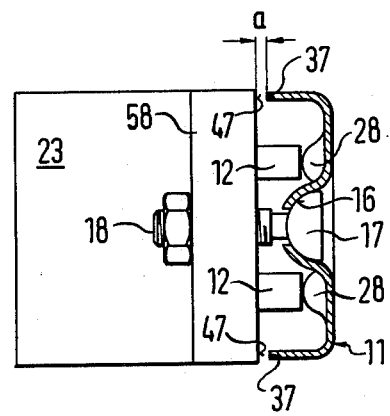
FIG. 8 is a topview, partially in cross-section, of the embodiment of FIG. 7.

FIGS. 7 and 8 show a simplified embodiment similar to the embodiment of FIGS. 5 and 6 in which only the distance between control lever 11 in the area of the ball end 17 and stop surface 47 is adjustable. For realization of an even clearance "a" between stop surfaces 37 and 47 on both sides, it is important that indentations 28 are tooled in a sufficiently precise manner. A still more precise tooling is necessary in the case of the embodiment of FIGS. 9 and 10, because in this embodiment an adjustment is provided neither between control lever 11 and actuating tappets 12 nor in the area of bolt 18. In this embodiment bolt 18 is screwed into a bore of extension 58 of housing 23 as far as a stop 18' on bolt 18. Stop 18' sets the desired clearance "a" between stop surfaces 37 and stop surface 47 upon abutment of indentations 28 at the pressurized actuating tappets 12.

However, to be able to reduce the precision of the manufacturing tolerances, the embodiments of FIGS. 1 through 6 provided with a double adjustment possibility are preferred.

The distance or the clearance "a" has be be sufficiently great to unhinderedly allow the balancing movement of control lever 11 occurring in normal operation.

Figure 9:
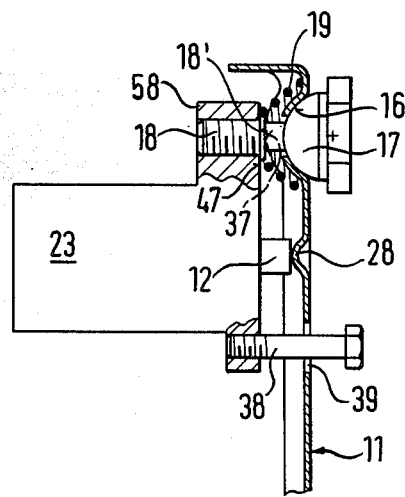
FIG. 9 is a schematic lateral view, partially in cross-section, of a fifth embodiment of a dual-circuit pressure control valve in accordance with the principles of the present invention.

To be able to optimally adjust distance "a" to housing 23 upon simultaneous abutment of control lever 11 at actuating tappets 12, even in the case of the embodiment according to FIGS. 9 and 10, a favorable improvement includes providing, opposite to the positions of stop surfaces 37 closest to the housing 23, stop pins 65 having circumferential groovings inserted to a predetermined depth into bores 66 of housing 23, bores 66 extending radially relative to stop surfaces 37. Stop pins 65 are secured in their position in bore 66 by deformation of the housing material. Springs 67 in bores 66 see to it that a certain resistance exists when pressing stop pins 65 into bore 66. The heads of pins 65 form stop surfaces 47 for stop surfaces 37.

By pressing stop pins 65 to a predetermined depth into the associated radial bore 66 by means of an appropriate tool, the optimum distance "a" is adjustable between stop surface 47 formed by the head of pins 65 and stop surfaces 37 of lever 11.

In principle it is possible to employ headless screws instead of stop pins 65, which screws will be screwed to a predetermined depth into radial bore 66 which are threaded in this case. Helical springs 67 could be dispensed with in this case, provided that suitable measures are available to provide a rotation-locking mechanism of screw 65.

In the embodiment of FIG. 11, ball end 17 is secured to housing 23 via an angled member 18" by means of bolts 68. Ball head 17 can be arranged axially adjustably within angled member 18" according to a preferred embodiment. Furthermore, angled member 18" is permitted to be supported axially adjustably at housing 23, for example, by the arrangement of slotted holes in the area of clamping bolts 68.

A particularly sensitive and precise adjustment of the distance "a" is provided in the embodiment according to FIG. 11 in that headless screws 69 are guided through tapholes 70 in lateral extension 58 of housing 23, which headless screws project in direction of stop surfaces 37 from the surface of extension 58 by a predetermined amount corresponding to the desired distance "a". A screw driver slot 71 enables an exact adjustment of the distance "a" from the side opposite to control lever 11. A lock nut 72 renders it possible to maintain the once exactly adjusted distance "a". It is understood that analogous to the embodiment of FIG. 10, a stop screw 69 is provided in each case opposite to both stop surfaces 37 of control lever 11.

While we have described above the principles of our invention in connection with specific apparatus it is to be clearly understood that this description is made only by way of example and not as a limitation to the scope of our invention as set forth in the objects thereof and in the accompanying claims.

We claim:

1. A dual-circuit pressure control valve to control pressure in each circuit of a hydraulic dual-circuit brake system for automotive vehicles comprising:
    a common control lever having a longitudinal axis, said control lever being subjected to a control force and acting upon a pair of control valve actuating tappets extending out of one surface of a housing, each of said pair of actuating tappets controlling pressure in a different one of said brake circuits;
    support means to support said control lever at said housing tiltable around said longitudinal axis and a transverse axis perpendicular to the longitudinal axes of said pair of actuating tappets and said longitudinal axis; and
    stop means disposed between said control lever and said housing to limit tilting of said control lever around said longitudinal axis without inhibiting tilting of said control lever around said transverse axis, said stop means including a housing stop surface adjacent said one surface of said housing, and a pair of circular stop surfaces each extending from said control lever on opposite sides of, parallel to and spaced from said longitudinal axis toward said one surface of said housing adjacent said housing stop surface, a central point of each of said pair of circular stop surfaces being disposed in a plane parallel to the longitudinal axes of said pair of actuating tappets containing said transverse axis, said pair of circular stop surface and said housing stop surface being spaced a predetermined distance from each other such that, upon failure of one of said brake circuits, that one of said pair of circular stop surface associated with that one of said pair of actuating tappets associated with the other of said brake circuits engages said housing stop surface after only a slight inward movement of the other of said pair of actuating tappets associated with said one of said brake circuits.

2. A pressure control valve according to claim 1, wherein
    said support means includes a ball cap formed in said control lever extending toward said housing and a ball end received in said ball cap, said ball end being fastened to said housing by a bolt extending through a bore in said lever, said bolt enabling an adjustment of said predetermined distance.

3. A pressure control valve according to claim 2, wherein
    an end of said bolt remote from said control lever is secured to an angle member having said housing stop surface, said angle member being secured to said housing in an adjustable manner to provide an additional adjustment of said predetermined distance, said ball end being secured to said bolt by a nut threaded onto the end of said bolt adjacent said control lever.

4. A pressure control valve according to claim 3, wherein
    said angle member includes a leg extending parallel to said bolt, said leg being secured to a corresponding surface of said housing by additional bolts extending through slotted holes in said leg whose larger dimension extends parallel to said bolt.

5. A pressure control valve according to claims 1 or 2, wherein
    said housing stop surface is provided by the surface of a leg of an angle member fastened to said housing, said leg including an opening for said bolt to pass therethrough.

6. A pressure control valve according to claim 5, wherein
    said ball end is an integral part of said bolt with said bolt being threaded into an extension of said housing to a predetermined depth.

7. A pressure control valve according to claim 6, further including
    a helical spring encircling said bolt to urge said ball cap against said ball end.

8. A pressure control valve according to claim 5, further including
    a helical spring encircling said bolt to urge said ball cap against said ball end.

9. A pressure control valve according to claims 1 or 2, wherein
    said ball end is an integral part of said bolt with said bolt being threaded into an extension of said housing to a predetermined depth.

10. A pressure control valve according to claims 1, 2, 3 or 4, further including
    a helical spring encircling said bolt to urge said ball cap against said ball end.

11. A pressure control valve according to claim 7, further including
    a pair of axially adjustable tappets each disposed in said control lever opposite a different one of said pair of actuating tappets.

12. A pressure control valve according to claim 6, further including
    a pair of axially adjustable tappets each disposed in said control lever opposite a different one of said pair of actuating tappets.

13. A pressure control valve according to claim 5, further including
    a pair of axially adjustable tappets each disposed in said control lever opposite a different one of said pair of actuating tappets.

14. A pressure control valve according to claim 8, further including
    a pair of axially adjustable tappets each disposed in said control lever opposite a different one of said pair of actuating tappets.

15. A pressure control valve according to claim 9, further including
    a pair of axially adjustable tappets each disposed in said control lever opposite a different one of said pair of actuating tappets.

16. A pressure control valve according to claim 10, further including a pair of axially adjustable tappets each disposed in said control lever opposite a different one of said pair of actuating tappets.

17. A pressure control valve according to claims 1, 2, 3 or 4, further including
a pair of axially adjustable tappets each disposed in said control lever opposite a different one of said pair of actuating tappets.

18. A pressure control valve according to claims 1 or 2, wherein
said housing stop surface includes at least two stop means each disposed in said housing opposite said central point of an associated one of said pair of circular stop surfaces each of said two stop means having an end surface to provide said housing stop surface.

19. A pressure control valve according to claim 18, wherein
each of said two stop means is a stop pin having a circumferential groove pressed into a bore of said housing to provide said predetermined distance, each of said stop pins being fixed in position by deformation of material of said housing into said groove.

20. A pressure control valve according to claim 18, wherein
each of said two stop means is a stop screw threaded into said housing and projecting from said one surface of said housing a predetermined amount.

21. A pressure control valve according to claim 1, wherein
said support means includes a ball cap formed in said control lever extending toward said housing and a ball end received in said ball cap, said ball end being fastened to said housing by a supporting member fastened to said housing and extending over said control lever remote from said one surface of said housing into engagement with said ball end.

* * * * *

UNITED STATES PATENT AND TRADEMARK OFFICE
CERTIFICATE OF CORRECTION

PATENT NO. : 4,427,239
DATED : January 24, 1984
INVENTOR(S) : Hans D. Reinartz, Bernd Schopper, Peter Tandler, Derek Lowe It is certified that error appears in the above-identified patent and that said Letters Patent are hereby corrected as shown below:

Title Sheet, Column 1, "[75] Inventors: Hans D. Reinartz, Frankfurt am Main; Bernd Schopper, Hattersheim, both of Fed. Rep. of Germany" should read --[75] Inventors: Hans D. Reinartz, Frankfurt am Main; Bernd Schopper, Hattersheim; Peter Tandler, Falkenstein; Derek Lowe, Glashutten, all of Fed. Rep. of Germany--

Signed and Sealed this

Fifth Day of June 1984

[SEAL]

Attest:

GERALD J. MOSSINGHOFF

Attesting Officer

Commissioner of Patents and Trademarks